United States Patent [19]
White, Jr. et al.

[11] Patent Number: 5,117,515
[45] Date of Patent: Jun. 2, 1992

[54] TOILET TRAINING DEVICE AND METHOD OF USE

[76] Inventors: Moreno J. White, Jr.; Wendy White, both of 22981 Hazelwood, El Toro, Calif. 92630

[21] Appl. No.: 746,312

[22] Filed: Aug. 15, 1991

Related U.S. Application Data

[63] Continuation of Ser. No. 529,223, May 25, 1990, abandoned, which is a continuation of Ser. No. 447,362, Dec. 6, 1989, abandoned, which is a continuation of Ser. No. 358,559, May 30, 1989, abandoned, which is a continuation of Ser. No. 260,188, Oct. 19, 1988, abandoned, which is a continuation of Ser. No. 889831, Jul. 25, 1986, abandoned, which is a continuation of Ser. No. 616,854, Jun. 4, 1984, abandoned.

[51] Int. Cl.$^5$ .................. A47K 17/00; E03D 9/00
[52] U.S. Cl. .......................... 4/661; 4/300.3; 428/913
[58] Field of Search .............. 4/300.3, 661; 434/247; 428/913

[56] References Cited

U.S. PATENT DOCUMENTS

| | | | |
|---|---|---|---|
| 3,176,317 | 4/1965 | Kelseaux | 4/420 |
| 3,263,241 | 8/1966 | Saulson | 4/457 |
| 3,654,064 | 4/1972 | Laumann | 4/451 X |
| 4,010,497 | 3/1977 | Menter et al. | 4/300.3 |
| 4,044,405 | 8/1977 | Kreiss | 4/661 X |
| 4,352,214 | 10/1982 | Belz | 4/243 |

FOREIGN PATENT DOCUMENTS

| | | |
|---|---|---|
| 2240957 | 2/1974 | Fed. Rep. of Germany .......... 4/661 |
| 2560763 | 9/1985 | France . |
| 1600786 | 10/1981 | United Kingdom . |

Primary Examiner—Charles E. Phillips

[57] ABSTRACT

An improved toilet training device and method of utilizing the same is disclosed characterized by use of a thin paper stock element adapted to float in a planar configuration upon the water surface within the toilet bowl for prolonged duration and upon contact with urine, rapidly sink within the toilet bowl and become flushable through the toilet bowl waste drain system. The element is preferably provided with indicia printed on both sides thereof representing a target or other geometric shape normally familiar to children and thereby attract the attention of a child and encourage toilet training.

5 Claims, 1 Drawing Sheet

TOILET TRAINING DEVICE AND METHOD OF USE

This application is a continuation of application Ser. No. 07/529,223 filed May 25, 1990, which is a continuation of Ser. No. 07/447,362 filed Dec. 6, 1989 and now abandoned, which is a continuation of Ser. No. 07/358,559 filed May 30, 1989 and now abandoned, which is a continuation of Ser. No. 07/260,188 filed Oct. 19, 1988 and now abandoned, which is a continuation of Ser. No. 06/889,831 filed July 25, 1986 and now abandoned, which is a continuation of Ser. No. 06/616,854 filed June 4, 1984 and now abandoned.

BACKGROUND OF THE INVENTION

The present invention relates generally to toilet training devices and more particularly to an improved toilet training device and method of utilizing the same which is characterized by use of a thin paper stock element adapted to float in a planer configuration upon the water surface within the toilet bowl for prolonged duration and subsequently upon contact with urine, rapidly sink within the toilet bowl.

As is well known, encouraging children to use the toilet during toilet training and keeping the surrounding areas of the toilet bowl clean and sanitary has long been known to be desirable. In this regard, toilet training has often times resulted in difficulty for both parents and children alike.

Whether dealing with male or female children during the toilet training period, a device to make urination into the toilet enjoyable for the child has been recognized to typically alleviate the extreme difficulty associated in the training period. Incorporating the principal of educational value into an enjoyable activity for children thereby promotes toilet training.

This principal has long been recognized to a limited extent in the prior art with various types of devices for attracting the attention of male children while urinating being introduced into the market place.

One such prior art device comprises a non-removable bulls-eye target which is adhesively connected to the interior walls of the toilet bowl below water surface so as to be visible through the water in the toilet bowl such as that disclosed in the U.S. Pat. No. 4,044,405 issued to Joel S. Kreiss on Aug. 30, 1977. Due to its permanent stationary position within the toilet bowl however, the Kreiss device typically becomes commonplace and often times boring to children and additionally possess difficulty in affixing the device to the interior wall of the toilet bowl.

Another prior art device comprises a rotatable propeller suspended by struts over the toilet bowl. The struts are connected by a ball and socket joint arrangement to a suction cup, which is then in turn attached to the external walls of the toilet such as that disclosed in the U.S. Pat. No. 2,703,407 issued to R. E. Henock et al. on Mar. 8, 1955. Due to the permanent attachment and suspension of the device adjacent to the toilet bowl, the use of the Henock device typically has proven awkward, unsanitary and additionally detracts from the normal use of the toilet by others.

Other types of prior art devices are known which sense a change in weight or water level in the toilet bowl and thereby activate a music or chime box alarm. However, such devices additionally prove awkward in use and further are extremely expensive to purchase. In the past, a few paper targets which float upon the water surface within the toilet bowl have been utilized which targets have included battleships or other military instruments pictured thereon. Examples of such devices are those devices known as "whizzers" and "potty pot shots". Although these paper stock devices are preferable over the permanent prior art devices, they typically curl and deform when placed on the water surface to an extent, which in most cases obscures the target picture formed thereon and therefore fail to accomplish their intended function.

Thus, there exists a substantial need in the art for an improved toilet training device and method of use which is relatively low cost, effective, and can be utilized without impairing or adversely affecting normal use of the toilet bowl i.e. for non-toilet training applications.

SUMMARY OF THE PRESENT INVENTION

The present inventions specifically addresses and alleviates the above-referenced deficiencies associated in the prior art. More particularly, the present invention comprises an improved toilet training device and method of utilizing the same which is characterized by use of thin paper stock element adapted to float in a planer configuration upon the water surface within the toilet bowl for prolonged duration and upon contact with urine, rapidly sink within the toilet bowl. The paper stock element is preferably provided with indicia printed on both sides thereof representing a target or other geometric shape normally familiar to children to attract and maintain the attention of the child and encourage toilet training.

The invention teaches a paper stock element or target which will float indefinitely upon the water in a toilet bowl until it is covered by urine at which time it rapidly sinks below water level and becomes flushable so as not to adversely affect the plumbing drain or waste system of the toilet bowl.

In use, the invention encourages both male and/or female children to use the toilet which has been found to maintain the attention of the child due primarily to the post-urination activity of the paper stock element in sinking below the level of the water surface upon contact with urine. As such the present invention teaches a improved toilet training device and method of use which is safe, effective and sanitary in operation and further does not adversely affect normal operation of the toilet bowl for non-toilet training application.

BRIEF DESCRIPTION OF THE DRAWINGS

These as well as other features of the present invention will become more apparent upon reference to the drawings wherein.

DETAILED DESCIPTION OF THE PREFERRED EMBODIMENT

Figure 1:
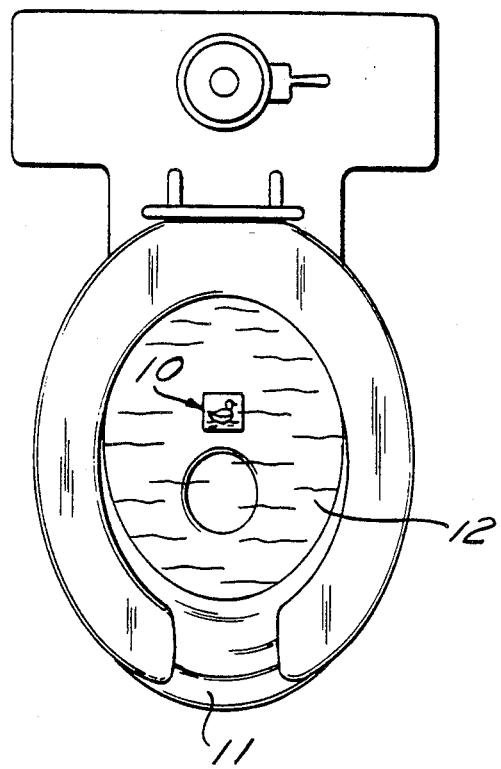
FIG. 1 depicts the present invention disposed within a conventional toilet bowl.
Figure 2:
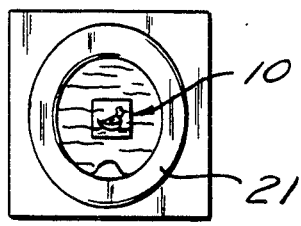
FIG. 2 depicts the present invention disposed in a child's potty-chair.

Referring to the figures, there is shown the improved toilet training device of the present invention designated generally by the numeral 10 which in FIG. 1 and 2 is disposed in a conventional toilet bowl 11 and child's potty-chair 21 respectively. As depicted, the device 10 forms a target which is disposed on the water surface 12 of the toilet bowl 11 or alternatively laid upon the bottom of the potty-chair 21 and which is aimed at by a child during urination.

Figure 1A:
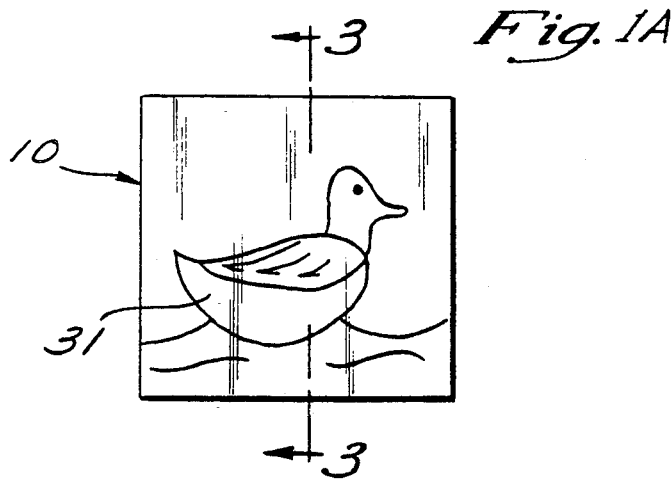
FIG. 1A comprises a top-plan view of the thin floatable element of the present invention.
Figure 3:
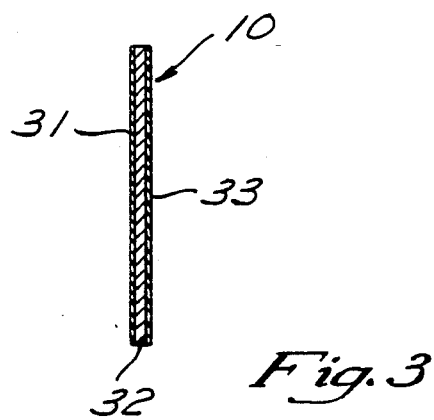
FIG. 3 is a cross-sectional view taken through Lines 3—3 of FIG. 1A.

As best shown in FIGS. 1A and FIG. 3, device 10 comprises a thin planer element having approximate dimensions of 2 inches by 2 inches. In the presently preferred embodiment, the device 10 is formed from a paper stock material such as a 70 pound glossy-paper stock material. This particular 70 pound glossy-paper stock has additionally been found to be advantageous for a construction material since it can readily accept printed designs and colors thereon as well as float on water (i.e. be suspended by water surface tension) for prolonged duration. The top surface of the device 10 is preferably provided with a bulls-eye or animal indicia 31 which is typically printed upon the glossy surface of the paper stock material by way of an conventional oil base printer's ink or water-base printer's ink with a cobalt additive. As will be recognized, differing indicia may be positioned thereon which in the preferred embodiment comprises a suitable graphic representation which draws and maintains the attention of children.

The rear surface or back surface of the device 10 in the preferred embodiment is additionally covered with a thin film coating 33 which exhibits water resistant properties. In the preferred embodiment the coating 33 comprises an oil base printer's ink which may be additionally applied in a graphic representation and a high-gloss over print varnish which retards the penetration of water into the fibers of the paper stock material 32. As will be recognized however, various coating 33 may be utilized in the present invention which possess the ability to retard the penetration of water into the fibers of the target material 32 for time periods of approximately 1 to 2 hours and subsequently, allows penetration of the water such that the device 10 may be flushed through the toilet waste system after use.

Preferably the coating 33 is uniformally applied to cover at least three-quarters of the back surface of the device 10. As will be recognized, the coating 33 prevents or retards the target 10 from curling and thereby allowing the same to float in a generally planer configuration upon the water surface. In this regard, when the coating 33 does not fully cover the back of the target, the coating must be applied to the back surface to retard the pentration of the water into the paper fibers in such a manner as to counter-balance the expansion and stresses created by water absorption in the non-coated portion of the paper fiber 32. More particularly the coating 33 must be applied in a pattern such that as compressive stresses are formed in the non-coated areas of the paper stock due to rapid water absorption, the tensile stresses existing in the adjacent coated areas of the paper stock will counter-act the same such that warpage of the paper stock will be maintained to a minimum until such time as the water absorption in the paper stock is completed (i.e. complete saturation) wherein all stresses are relieved.

With the structure defined, the operation and method of utilizing the device 10 of the present invention may be described. With specific reference to FIG. 1, when it is desired to attempt to toilet train or improve urination aiming of a child (not shown) the device 10 of the present invention may be placed upon the water surface of the toilet bowl 11 with its upper surface being disposed so as to be visually apparent to the child. Due to the relatively thin configuration of the device 10, when positioned upon the water 12, the device 10 floats thereupon in a planer configuration generally contiguous with the plane of the water surface 12 and is supported thereon by the surface tension of the water surface 12. In view of the coating applied to the back surface of the paper stock 32 of the device 10, the paper stock does not immediately absorb water, and is therefore light enough to be supported by surface tension of the water whereby the device 10 is capable of floating upon the water surface 12 for an extended duration i.e. approximately 1 to 2 hours without curling so as to be visually apparent to the child user. The child user may then focuses his attention upon the device 10 and attempt to urinate upon the same. When the device 10 is contacted by urine, the effective weight of the device 10 increases due to supporting the urine thereon which increased weight causes the water surface tension to be broken and the device rapidly sinks below the water level 12. Once disposed below the water level 12, the device 10 degrades by absorbing water to a flushable material therein which can then be disposed of merely by flushing the toilet bowl 11 in the conventional manner such that the device proceed downwardly through the waste drain system of the toilet 11 in a conventional manner.

Referring more particularly to FIG. 2, the operation and method of utilizing the device 10 of the present invention in a potty-chair is disclosed and when water is placed within a potty-chair in a conventional manner, the utilization of the device 10 is analogous to that disclosed in relation to the toilet bowl 11. Alternatively, however when water is not placed within the bowl of the potty-chair 20, the device 10 may be positioned upon the lower most surface of the potty-chair and be utilized as a target for urination. After being contacted with urine, the device 10 becomes supple or pliable wherein the device 10 along with the urine and/or other waste of the child can be disposed of in a conventional manner.

Thus, it will be recognized that the present invention comprises a significant improvement over the prior art devices. In addition, those skilled in the art will recognized that although in the preferred embodiment certain materials and material sizes have been identified, various modifications and substitutions can be made without departing from the spirit of the present invention and such modifications and substitutions are clearly contemplated herein.

What is claimed is:

1. An improved toilet training device for use in a toilet bowl containing water, to aid in the toilet training of children comprising:

a thin planar element formed to be positioned within said toilet bowl, said element being formed of a paper fiber stock material having a top surface and a bottom surface, wherein:

(i) said bottom surface has a substantially uniform coating applied thereto to cover substantially three-quarters of said bottom surface, so that said device will float upon the water surface within the toilet bowl, in a generally contiguous orientation upon the water surface with said bottom surface facing downwardly, for an extended duration:

said coating being applied to said bottom surface to retard the penetration of the water into the paper fibers in such a manner as to counter-balance the expansion and stresses created by water absorption in the non-coated portion of the paper fiber such that as compressive stresses are formed in the non-coated areas of the paper stock due to rapid water absorption, the tensile stresses existing in the adjacent coated areas of the paper stock will counter-act the same such that warpage of the paper stock will be maintained to a minimum until such time as said paper stock is saturated, and (ii) said top surface is partially coated with a water resistant covering, whereby when urine is deposited thereon the effective weight of the element will increase thereby causing the surface tension of the water within the toilet bowl to be broken thus causing the element to sink below the water surface and degrade by absorbing water so as to be flushable through the waste drain of the toilet bowl.

2. The device of claim 1 wherein said paper fiber stock material is thin in cross section.

3. The device of claim 1 wherein said planar element includes indicia printed on said top surface representing a geometric shape forming a urination target.

4. The device of claim 1 wherein said film partially covering said top surface comprises an oil base printer's ink and said film completely covering said bottom surface comprises varnish.

5. The device of claim 4 wherein said paper fiber stock comprises a 70 lb. paper fiber stock material.

* * * * *